US007064740B2

(12) United States Patent
Daly

(10) Patent No.: US 7,064,740 B2
(45) Date of Patent: Jun. 20, 2006

(54) BACKLIT DISPLAY WITH IMPROVED DYNAMIC RANGE

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 230 days.

(21) Appl. No.: 10/007,118

(22) Filed: Nov. 9, 2001

(65) Prior Publication Data

US 2003/0090455 A1 May 15, 2003

(51) Int. Cl.
*G09G 3/36* (2006.01)
*G02F 1/1335* (2006.01)

(52) U.S. Cl. ........................................ 345/102; 349/61

(58) Field of Classification Search .................. 345/87, 345/102, 81, 690, 691, 644; 349/61, 62, 349/64, 68, 70; 362/561
See application file for complete search history.

(56) References Cited

U.S. PATENT DOCUMENTS

| | | | |
|---|---|---|---|
| 3,329,474 | A | 7/1967 | Harris et al. |
| 3,375,052 | A | 3/1968 | Kosanke et al. |
| 3,428,743 | A | 2/1969 | Hanlon |
| 3,439,348 | A | 4/1969 | Harris et al. |
| 3,499,700 | A | 3/1970 | Harris et al. |
| 3,503,670 | A | 3/1970 | Kosanke et al. |
| 3,554,632 | A | 1/1971 | Chitayat |
| 3,947,227 | A | 3/1976 | Granger et al. |
| 4,012,116 | A | 3/1977 | Yevick |
| 4,110,794 | A | 8/1978 | Lester et al. |
| 4,170,771 | A | 10/1979 | Bly |
| 4,385,806 | A | 5/1983 | Fergason |
| 4,410,238 | A | 10/1983 | Hanson |
| 4,441,791 | A | 4/1984 | Hornbeck |
| 4,516,837 | A | 5/1985 | Soref et al. |
| 4,540,243 | A | 9/1985 | Fergason |
| 4,562,433 | A | 12/1985 | Biferno |
| 4,574,364 | A | 3/1986 | Tabata et al. |
| 4,611,889 | A | 9/1986 | Buzak |
| 4,648,691 | A | 3/1987 | Oguchi et al. |
| 4,649,425 | A | 3/1987 | Pund |
| 4,682,270 | A | 7/1987 | Whitehead et al. |
| RE32,521 | E | 10/1987 | Fergason |
| 4,715,010 | A | 12/1987 | Inoue et al. |
| 4,719,507 | A | 1/1988 | Bos |
| 4,755,038 | A | 7/1988 | Baker |
| 4,758,818 | A | 7/1988 | Vatne |
| 4,766,430 | A | 8/1988 | Gillette et al. |
| 4,834,500 | A | 5/1989 | Hilsum et al. |
| 4,862,270 | A | 8/1989 | Nishio |

(Continued)

FOREIGN PATENT DOCUMENTS

| | | |
|---|---|---|
| EP | 0 829 747 | 3/1998 |

(Continued)

OTHER PUBLICATIONS

Yamada et al., LED Backlight for Color LCDs, Proc. SID, International Display Workshop (IDW'00) Nov., 2000, Japan, 363-397.

(Continued)

*Primary Examiner*—Sumati Lefkowitz
*Assistant Examiner*—Alecia D. Nelson
(74) *Attorney, Agent, or Firm*—Chernoff, Vilhauer, McClung & Stenzel

(57) ABSTRACT

A display is backlit by a source having spatially modulated luminance to attenuate illumination of dark areas of images and increase the dynamic range of the display.

11 Claims, 4 Drawing Sheets

U.S. PATENT DOCUMENTS 4,885,783 A 12/1989 Whitehead et al.
4,888,690 A 12/1989 Huber
4,910,413 A 3/1990 Tamune
4,917,452 A 4/1990 Liebowitz
4,933,754 A 6/1990 Reed et al.
4,954,789 A 9/1990 Sampsell
4,958,915 A 9/1990 Okada et al.
4,969,717 A 11/1990 Mallinsoh
4,981,838 A 1/1991 Whitehead
4,991,924 A 2/1991 Shankar et al.
5,012,274 A 4/1991 Dolgoff
5,013,140 A 5/1991 Healey et al.
5,074,647 A 12/1991 Fergason et al.
5,075,789 A 12/1991 Jones et al.
5,083,199 A 1/1992 Borner
5,122,791 A 6/1992 Gibbons et al.
5,128,782 A 7/1992 Wood
5,138,449 A 8/1992 Kerpchar
5,144,292 A 9/1992 Shiraishi et al.
5,164,829 A 11/1992 Wada
5,168,183 A 12/1992 Whitehead
5,187,603 A 2/1993 Bos
5,202,897 A 4/1993 Whitehead
5,206,633 A 4/1993 Zalph
5,214,758 A 5/1993 Ohba et al.
5,222,209 A 6/1993 Murata et al.
5,247,366 A 9/1993 Ginosar et al.
5,256,676 A 10/1993 Hider et al.
5,300,942 A 4/1994 Dolgoff
5,305,146 A 4/1994 Nakagaki et al.
5,311,217 A 5/1994 Guerin et al.
5,313,225 A 5/1994 Miyadera
5,317,400 A 5/1994 Gurley et al.
5,339,382 A 8/1994 Whitehead
5,357,369 A 10/1994 Pilling et al.
5,359,345 A 10/1994 Hunter
5,369,266 A 11/1994 Nohda et al.
5,386,253 A 1/1995 Fielding
5,394,195 A * 2/1995 Herman ...................... 348/675
5,395,755 A 3/1995 Thorpe et al.
5,416,496 A 5/1995 Wood
5,422,680 A 6/1995 Lagoni et al.
5,426,312 A 6/1995 Whitehead
5,436,755 A 7/1995 Guerin
5,450,498 A 9/1995 Whitehead
5,461,397 A * 10/1995 Zhang et al. ............... 345/102
5,477,274 A 12/1995 Akiyoshi et al.
5,481,637 A 1/1996 Whitehead
5,570,210 A 10/1996 Yoshida et al.
5,579,134 A 11/1996 Lengyel
5,580,791 A 12/1996 Thorpe et al.
5,592,193 A 1/1997 Chen
5,617,112 A 4/1997 Yoshida et al.
5,642,015 A 6/1997 Whitehead et al.
D381,335 S 7/1997 Whitehead
5,650,880 A 7/1997 Shuter et al.
5,652,672 A 7/1997 Huignard et al.
5,661,839 A 8/1997 Whitehead
5,682,075 A 10/1997 Bolleman et al.
5,684,354 A 11/1997 Gleckman
5,689,283 A 11/1997 Shirochi
5,715,347 A 2/1998 Whitehead
5,717,422 A 2/1998 Fergason
5,729,242 A 3/1998 Margerum et al.
5,754,159 A 5/1998 Wood et al.
5,767,837 A 6/1998 Hara
5,784,181 A 7/1998 Loiseaux et al.
5,796,382 A 8/1998 Beeteson
5,854,662 A 12/1998 Yuyama et al.
5,886,681 A 3/1999 Walsh et al.
5,889,567 A 3/1999 Swanson et al.
5,892,325 A 4/1999 Gleckman
5,901,266 A 5/1999 Whitehead
5,939,830 A 8/1999 Praiswater
5,959,777 A 9/1999 Whitehead
5,969,704 A 10/1999 Green et al.
5,978,142 A 11/1999 Blackham et al.
5,986,628 A 11/1999 Tuenge et al.
5,995,070 A 11/1999 Kitada
5,999,307 A 12/1999 Whitehead et al.
6,008,929 A * 12/1999 Akimoto et al. ............ 359/264
6,024,462 A 2/2000 Whitehead
6,025,583 A 2/2000 Whitehead
6,043,591 A 3/2000 Gleckman
6,050,704 A 4/2000 Park
6,064,784 A 5/2000 Whitehead et al.
6,079,844 A 6/2000 Whitehead et al.
6,111,559 A * 8/2000 Motomura et al. ......... 345/102
6,111,622 A 8/2000 Abileah
6,120,588 A 9/2000 Jacobson
6,120,839 A 9/2000 Comiskey et al.
6,129,444 A 10/2000 Tognoni
6,160,595 A 12/2000 Kishimoto
6,172,798 B1 1/2001 Albert et al.
6,215,920 B1 4/2001 Whitehead et al.
6,243,068 B1 6/2001 Evanickey et al.
6,267,850 B1 7/2001 Bailey et al.
6,268,843 B1 7/2001 Arakawa
6,276,801 B1 8/2001 Fielding
6,300,931 B1 * 10/2001 Someya et al. ............. 345/102
6,300,932 B1 10/2001 Albert
6,304,365 B1 10/2001 Whitehead
6,323,455 B1 11/2001 Bailey et al.
6,323,989 B1 11/2001 Jacobsen et al.
6,327,072 B1 12/2001 Comiskey et al.
RE37,594 E 3/2002 Whitehead
6,359,662 B1 * 3/2002 Walker ....................... 348/743
6,377,383 B1 4/2002 Whitehead et al.
6,384,979 B1 5/2002 Whitehead et al.
6,414,664 B1 * 7/2002 Conover et al. .............. 345/89
6,418,253 B1 7/2002 Whitehead
6,428,189 B1 8/2002 Hochstein
6,437,921 B1 8/2002 Whitehead
6,439,731 B1 8/2002 Johnson et al.
6,448,944 B1 9/2002 Ronzani et al.
6,448,951 B1 * 9/2002 Sakaguchi et al. ............ 345/88
6,448,955 B1 9/2002 Evanicky et al.
6,452,734 B1 9/2002 Whitehead et al.
6,483,643 B1 11/2002 Zuchowski
6,559,827 B1 * 5/2003 Mangerson ................. 345/102
6,574,025 B1 6/2003 Whitehead et al.
6,590,561 B1 * 7/2003 Kabel et al. ................ 345/102
6,597,339 B1 * 7/2003 Ogawa ....................... 345/102
6,657,607 B1 12/2003 Evanickey et al.
6,680,834 B1 1/2004 Williams
6,791,520 B1 9/2004 Choi
6,803,901 B1 10/2004 Numao
6,816,141 B1 11/2004 Fergason
6,828,816 B1 12/2004 Ham
6,891,672 B1 5/2005 Whitehead et al.
2001/0035853 A1 11/2001 Hoelen et al.
2001/0038736 A1 11/2001 Whitehead
2002/0057253 A1 * 5/2002 Lim et al. ................... 345/102
2002/0063963 A1 5/2002 Whitehead et al.
2002/0105709 A1 8/2002 Whitehead et al.
2002/0135553 A1 * 9/2002 Nagai et al. .................. 345/89
2002/0159002 A1 10/2002 Chang
2002/0159692 A1 10/2002 Whitehead
2002/0171617 A1 * 11/2002 Fuller ......................... 345/102
2003/0048393 A1 3/2003 Sayag
2003/0090455 A1 5/2003 Daly
2003/0107538 A1 * 6/2003 Asao et al. ................... 345/87
2004/0057017 A1 3/2004 Childers et al.

FOREIGN PATENT DOCUMENTS

| | | | |
|---|---|---|---|
| EP | 606162 | B1 | 11/1998 |
| EP | 1 202 244 | | 5/2002 |
| FR | 2611389 | A1 | 2/1987 |
| JP | 01098383 | A | 4/1989 |
| JP | 3-71111 | | 3/1991 |
| JP | 3-198026 | | 8/1991 |
| JP | 5-66501 | | 3/1993 |
| JP | 5-80716 | | 4/1993 |
| JP | 5-273523 | | 10/1993 |
| JP | 05289044 | A | 11/1993 |
| JP | 6247623 | A | 9/1994 |
| JP | 6313018 | A | 11/1994 |
| JP | 7-121120 | | 5/1995 |
| JP | 9-244548 | | 9/1997 |
| JP | 10-508120 | | 8/1998 |
| JP | 11-052412 | | 2/1999 |
| JP | 2000-206488 | | 7/2000 |
| JP | 2000-275995 | | 10/2000 |
| JP | 2000-321571 | | 11/2000 |
| JP | 2002-091385 | | 3/2002 |
| JP | 3523170 | | 2/2004 |
| WO | WO 91/15843 | | 10/1991 |
| WO | WO 96/33483 | | 10/1996 |
| WO | WO00/75720 | | 12/2000 |
| WO | WO 01/69584 | | 9/2001 |
| WO | WO 02/03687 | | 1/2002 |
| WO | WO 02/79862 | | 10/2002 |
| WO | WO 03/77013 | | 9/2003 |

OTHER PUBLICATIONS

Yamada et al., Color Sequential LCD Based on OCB with LED Backlight, SID Digest, 1180-1183.
Funamoto et al., High Picture Quality Technique for LCD Televisions: LCD AI, Proc. SID, International Display Workshop (IDW'00), Nov., 2000, pp. 1157-1158.
N. Cheung et al., "Configurable Entropy Coding Scheme for H.26L," ITU Telecommunications Standardization Sector Study Group 16, Elbsee, Germany, Jan. 2001.

* cited by examiner

BACKLIT DISPLAY WITH IMPROVED DYNAMIC RANGE

CROSS REFERENCE TO RELATED APPLICATIONS

Not Applicable.

BACKGROUND OF THE INVENTION

The present invention relates to backlit displays and, more particularly, to a backlit display with improved dynamic range.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to an observer or is blocked is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed during its transits of the panel and images displayed on this type of panel may be difficult to see except under the best lighting conditions. On the other hand, LCD panels used for computer displays and video screens are typically backlit with flourescent tubes or arrays of light-emitting diodes (LEDs) that are built into the sides or back of the panel. To provide a display with a more uniform light level, light from these point or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In an LCD the optical axes of the first and second polarizers are arranged at an angle so that light passing through the first polarizer would normally be blocked from passing through the second polarizer in the series. However, a layer of translucent liquid crystals occupies a cell gap separating the two polarizers. The physical orientation of the molecules of liquid crystal can be controlled and the plane of vibration of light transiting the columns of molecules spanning the layer can be rotated to either align or not align with the optical axes of the polarizers.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series polarizers of the translucent panel assembly to produce a lighted area of the display surface when viewed from the front of the panel.

To darken a pixel and create an image, a voltage, typically controlled by a thin film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

LCDs can produce bright, high resolution, color images and are thinner, lighter, and draw less power than cathode ray tubes (CRTs). As a result, LCD usage is pervasive for the displays of portable computers, digital clocks and watches, appliances, audio and video equipment, and other electronic devices. On the other hand, the use of LCDs in certain "high end markets," such as medical imaging and graphic arts, is frustrated, in part, by the limited ratio of the luminance of dark and light areas or dynamic range of an LCD. The luminance of a display is a function the gain and the leakage of the display device. The primary factor limiting the dynamic range of an LCD is the leakage of light through the LCD from the backlight even though the pixels are in an "off" (dark) state. As a result of leakage, dark areas of an LCD have a gray or "smoky black" appearance instead of a solid black appearance. Light leakage is the result of the limited extinction ratio of the cross-polarized LCD elements and is exacerbated by the desirability of an intense backlight to enhance the brightness of the displayed image. While bright images are desirable, the additional leakage resulting from usage of a more intense light source adversely affects the dynamic range of the display.

The primary efforts to increase the dynamic range of LCDs have been directed to improving the properties of materials used in LCD construction. As a result of these efforts, the dynamic range of LCDs has increased since their introduction and high quality LCDs can achieve dynamic ranges between 250:1 and 300:1. This is comparable to the dynamic range of an average quality CRT when operated in a well-lit room but is considerably less than the 1000:1 dynamic range that can be obtained with a well-calibrated CRT in a darkened room or dynamic ranges of up to 3000:1 that can be achieved with certain plasma displays.

Image processing techniques have also been used to minimize the effect of contrast limitations resulting from the limited dynamic range of LCDs. Contrast enhancement or contrast stretching alters the range of intensity values of image pixels in order to increase the contrast of the image. For example, if the difference between minimum and maximum intensity values is less than the dynamic range of the display, the intensities of pixels may be adjusted to stretch the range between the highest and lowest intensities to accentuate features of the image. Clipping often results at the extreme white and black intensity levels and frequently must be addressed with gain control techniques. However, these image processing techniques do not solve the problems of light leakage and the limited dynamic range of the LCD and can create imaging problems when the intensity level of a dark scene fluctuates.

Another image processing technique intended to improve the dynamic range of LCDs modulates the output of the backlight as successive frames of video are displayed. If the frame is relatively bright, a backlight control operates the light source at maximum intensity, but if the frame is to be darker, the backlight output is attenuated to a minimum intensity to reduce leakage and darken the image. However, the appearance of a small light object in one of a sequence of generally darker frames will cause a noticeable fluctuation in the light level of the darker images.

What is desired, therefore, is a liquid crystal display having an increased dynamic range.

DETAILED DESCRIPTION OF THE INVENTION

Figure 1:
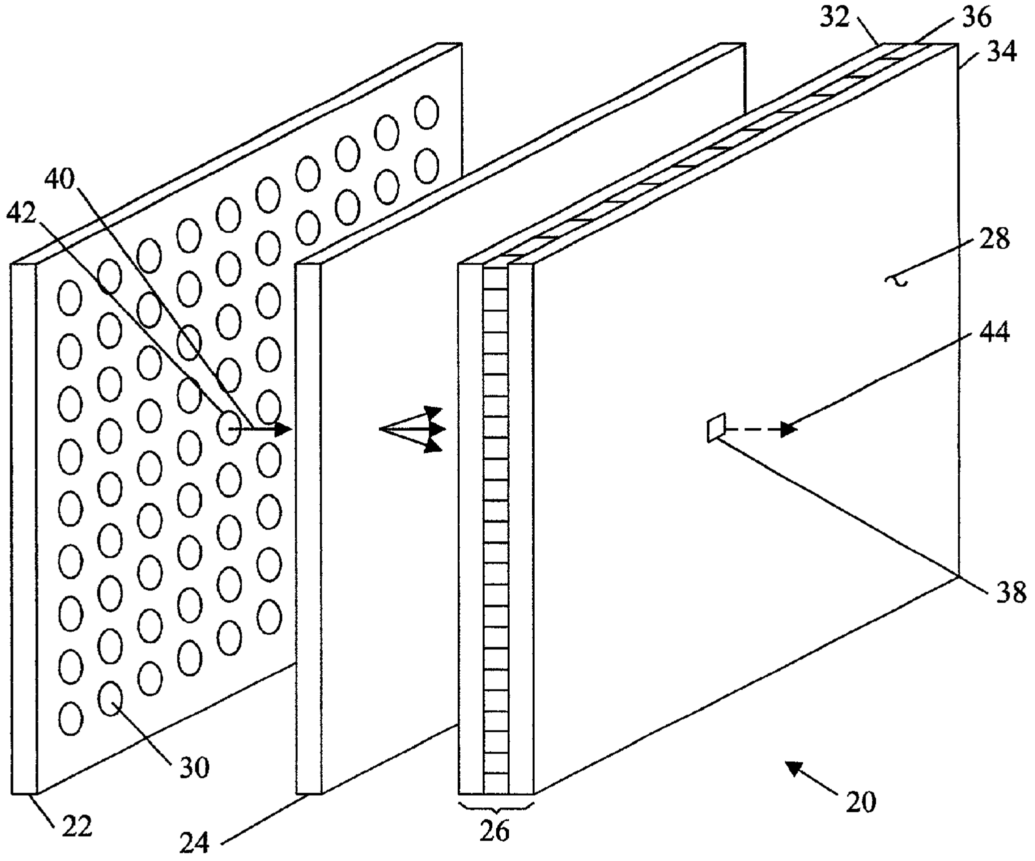
FIG. 1 is a schematic diagram of a liquid crystal display (LCD).

Referring to FIG. 1, a backlit display 20 comprises, generally, a backlight 22, a diffuser 24, and a light valve 26 (indicated by a bracket) that controls the transmittance of light from the backlight 22 to a user viewing an image displayed at the front of the panel 28. The light valve, typically comprising a liquid crystal apparatus, is arranged to electronically control the transmittance of light for a picture element or pixel. Since liquid crystals do not emit light, an external source of light is necessary to create a visible image. The source of light for small and inexpensive LCDs, such as those used in digital clocks or calculators, may be light that is reflected from the back surface of the panel after passing through the panel. Likewise, liquid crystal on silicon (LCOS) devices rely on light reflected from a backplane of the light valve to illuminate a display pixel. However, LCDs absorb a significant portion of the light passing through the assembly and an artificial source of light such as the backlight 22 comprising flourescent light tubes or an array of light sources 30 (e.g., light-emitting diodes (LEDs)), as illustrated in FIG. 1, is necessary to produce pixels of sufficient intensity for highly visible images or to illuminate the display in poor lighting conditions. There may not be a light source 30 for each pixel of the display and, therefore, the light from the point or line sources is typically dispersed by a diffuser panel 24 so that the lighting of the front surface of the panel 28 is more uniform.

Light radiating from the light sources 30 of the backlight 22 comprises electromagnetic waves vibrating in random planes. Only those light waves vibrating in the plane of a polarizer's optical axis can pass through the polarizer. The light valve 26 includes a first polarizer 32 and a second polarizer 34 having optical axes arrayed at an angle so that normally light cannot pass through the series of polarizers. Images are displayable with an LCD because local regions of a liquid crystal layer 36 interposed between the first 32 and second 34 polarizer can be electrically controlled to alter the alignment of the plane of vibration of light relative of the optical axis of a polarizer and, thereby, modulate the transmittance of local regions of the panel corresponding to individual pixels 36 in an array of display pixels.

The layer of liquid crystal molecules 36 occupies a cell gap having walls formed by surfaces of the first 32 and second 34 polarizers. The walls of the cell gap are rubbed to create microscopic grooves aligned with the optical axis of the corresponding polarizer. The grooves cause the layer of liquid crystal molecules adjacent to the walls of the cell gap to align with the optical axis of the associated polarizer. As a result of molecular forces, each succeeding molecule in the column of molecules spanning the cell gap will attempt to align with its neighbors. The result is a layer of liquid crystals comprising innumerable twisted columns of liquid crystal molecules that bridge the cell gap. As light 40 originating at a light source element 42 and passing through the first polarizer 32 passes through each translucent molecule of a column of liquid crystals, its plane of vibration is "twisted" so that when the light reaches the far side of the cell gap its plane of vibration will be aligned with the optical axis of the second polarizer 34. The light 44 vibrating in the plane of the optical axis of the second polarizer 34 can pass through the second polarizer to produce a lighted pixel 38 at the front surface of the display 28.

To darken the pixel 38, a voltage is applied to a spatially corresponding electrode of a rectangular array of transparent electrodes deposited on a wall of the cell gap. The resulting electric field causes molecules of the liquid crystal adjacent to the electrode to rotate toward alignment with the field. The effect is to "untwist" the column of molecules so that the plane of vibration of the light is progressively rotated away from the optical axis of the polarizer as the field strength increases and the local transmittance of the light valve 26 is reduced. As the transmittance of the light valve 26 is reduced, the pixel 38 progressively darkens until the maximum extinction of light 40 from the light source 42 is obtained. Color LCD displays are created by varying the intensity of transmitted light for each of a plurality of primary color elements (typically, red, green, and blue) elements making up a display pixel.

The dynamic range of an LCD is the ratio of the luminous intensities of brightest and darkest values of the displayed pixels. The maximum intensity is a function of the intensity of the light source and the maximum transmittance of the light valve while the minimum intensity of a pixel is a function of the leakage of light through the light valve in its most opaque state. Since the extinction ratio, the ratio of input and output optical power, of the cross-polarized elements of an LCD panel is relatively low, there is considerable leakage of light from the backlight even if a pixel is turned "off." As a result, a dark pixel of an LCD panel is not solid black but a "smoky black" or gray. While improvements in LCD panel materials have increased the extinction ratio and, consequently, the dynamic range of light and dark pixels, the dynamic range of LCDs is several times less than available with other types of displays. In addition, the limited dynamic range of an LCD can limit the contrast of some images. The current inventor concluded that the primary factor limiting the dynamic range of LCDs is light leakage when pixels are darkened and that the dynamic range of an LCD can be improved by spatially modulating the output of the panel's backlight to attenuate local luminance levels in areas of the display that are to be darker. The inventor further concluded that combining spatial and temporal modulation of the illumination level of the backlight would improve the dynamic range of the LCD while limiting demand on the driver of the backlight light sources.

Figure 2:
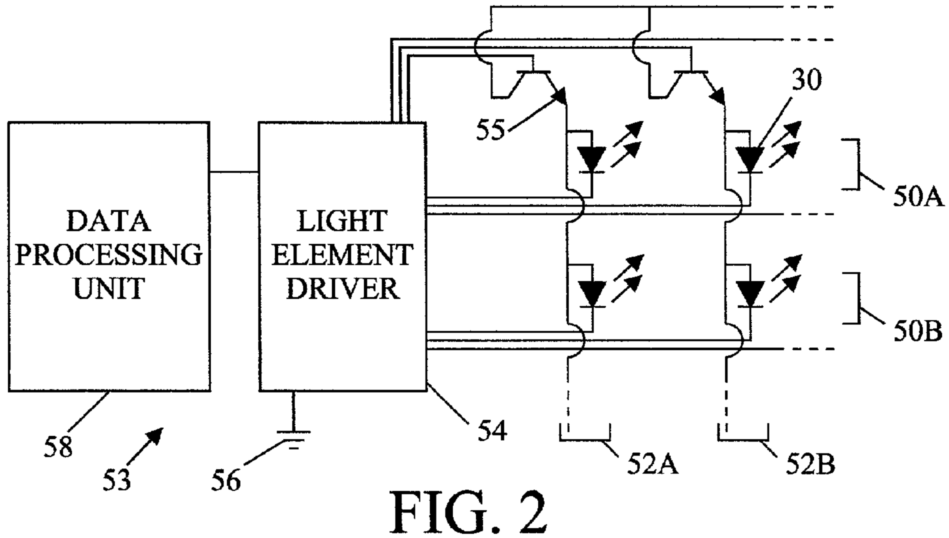
FIG. 2 is a schematic diagram of a driver for modulating the illumination of a plurality of light source elements of a backlight.

In the backlit display 20 with extended dynamic range, the backlight 22 comprises an array of locally controllable light sources 30. The individual light sources 30 of the backlight may be light-emitting diodes (LEDs), an arrangement of phosphors and lensets, or other suitable light-emitting devices. The individual light sources 30 of the backlight array 22 are independently controllable to output light at a luminance level independent of the luminance level of light output by the other light sources so that a light source can be modulated in response to the luminance of the corresponding image pixel. Referring to FIG. 2, the light sources 30 (LEDs illustrated) of the array 22 are typically arranged in the rows, for examples, rows 50*a* and 50*b*, (indicated by brackets) and columns, for examples, columns 52*a* and 52*b* (indicated by brackets) of a rectangular array. The output of the light sources 30 of the backlight are controlled by a backlight driver 53. The light sources 30 are driven by a light source driver 54 that powers the elements by selecting a column of elements 52*a* or 52*b* by actuating a column selection transistor 55 and connecting a selected light source 30 of the selected column to ground 56. A data processing unit 58, processing the digital values for pixels of an image to be displayed, provides a signal to the light driver 54 to select the appropriate light source 30 corresponding to the displayed pixel and to drive the light source with a power level to produce an appropriate level of illumination of the light source.

Figure 3:
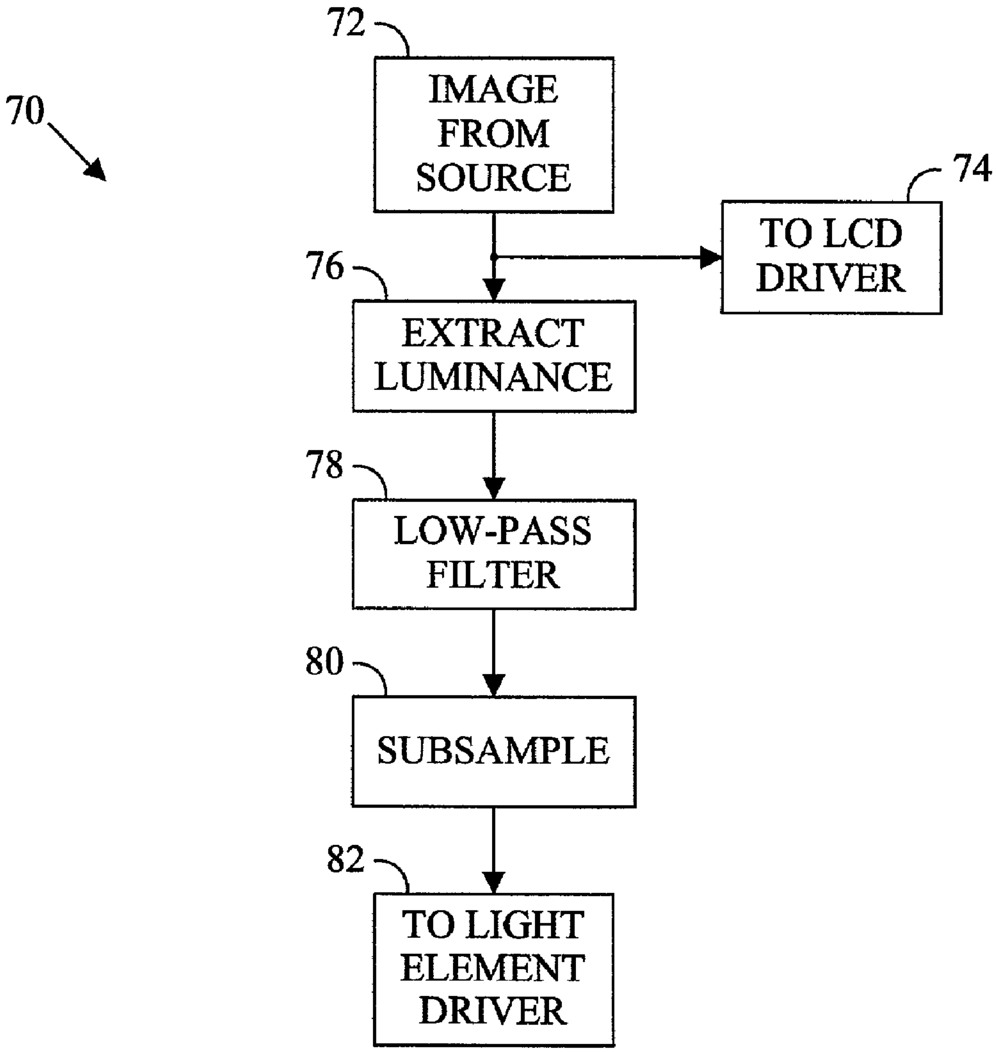
FIG. 3 is a flow diagram of a first technique for increasing the dynamic range of an LCD.

To enhance the dynamic range of the LCD, the illumination of a light source, for example light source 42, of the backlight 22 is varied in response to the desired rumination of a spatially corresponding display pixel, for example pixel 38. Referring to FIG. 3, in a first dynamic range enhancement technique 70, the digital data describing the pixels of the image to be displayed are received from a source 72 and transmitted to an LCD driver 74 that controls the operation of light valve 26 and, thereby, the transmittance of the local region of the LCD corresponding to a display pixel, for example pixel 38.

A data processing unit 58 extracts the luminance of the display pixel from the pixel data 76 if the image is a color image. For example, the luminance signal can be obtained by a weighted summing of the red, green, and blue (RGB) components of the pixel data (e.g., 0.33R+0.57G+0.11B). If the image is a black and white image, the luminance is directly available from the image data and the extraction step 76 can be omitted. The luminance signal is low-pass filtered 78 with a filter having parameters determined by the illumination profile of the light source 30 as affected by the diffuser 24 and properties of the human visual system. Following filtering, the signal is subsampled 80 to obtain a light source illumination signal at spatial coordinates corresponding to the light sources 30 of the backlight array 22. As the rasterized image pixel data are sequentially used to drive 74 the display pixels of the LCD light valve 26, the subsampled luminance signal 80 is used to output a power signal to the light source driver 82 to drive the appropriate light source to output a luminance level according a relationship between the luminance of the image pixel and the luminance of the light source. Modulation of the backlight light sources 30 increases the dynamic range of the LCD pixels by attenuating illumination of "darkened" pixels while the luminance of a "fully on" pixel is unchanged.

Figure 4:
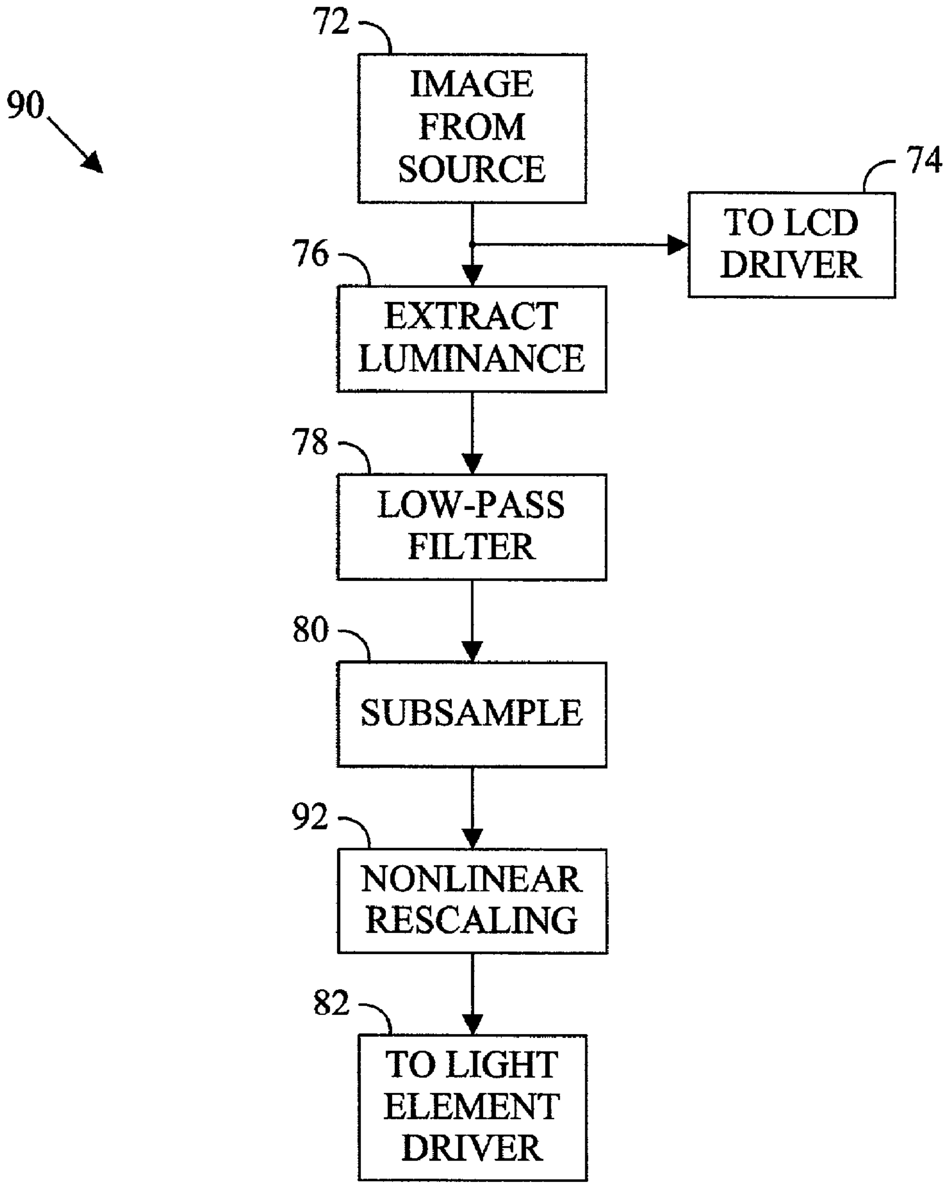
FIG. 4 is a flow diagram of a second technique for increasing the dynamic range of an LCD.

Spatially modulating the output of the light sources 30 according to the sub-sampled luminance data for the display pixels extends the dynamic range of the LCD but also alters the tonescale of the image and may make the contrast unacceptable. Referring to FIG. 4, in a second technique 90 the contrast of the displayed image is improved by resealing the sub-sampled luminance signal relative to the image pixel data so that the illumination of the light source 30 will be appropriate to produce the desired gray scale level at the displayed pixel. In the second technique 90 the image is obtained from the source 72 and sent to the LCD driver 74 as in the first technique 70. Likewise, the luminance is extracted, if necessary, 76, filtered 78 and subsampled 80. However, reducing the illumination of the backlight light source 30 for a pixel while reducing the transmittance of the light valve 26 alters the slope of the grayscale at different points and can cause the image to be overly contrasty (also known as the point contrast or gamma). To avoid undue contrast the luminance sub-samples are rescaled 92 to provide a constant slope grayscale.

Likewise, resealing 92 can be used to simulate the performance of another type of display such as a CRT. The emitted luminance of the LCD is a function of the luminance of the light source 30 and the transmittance of the light valve 26. As a result, the appropriate attenuation of the light from a light source to simulate the output of a CRT is expressed by:

$$LS_{attenuation}(CV) = \frac{L_{CRT}}{L_{LCD}} = \frac{\text{gain}(CV + V_d)^{\gamma} + leakage_{CRT}}{\text{gain}(CV + V_d)^{\gamma} + leakage_{LCD}}$$

where: $LS_{attenuation}$(CV)=the attenuation of the light source as a function of the digital value of the image pixel $L_{CRT}$=the luminance of the CRT display $L_{LCD}$=the luminance of the LCD display $V_d$=an electronic offset $\gamma$=the cathode gamma The attenuation necessary to simulate the operation of a CRT is nonlinear function and a look up table is convenient for use in resealing 92 the light source luminance according to the nonlinear relationship.

Figure 5:
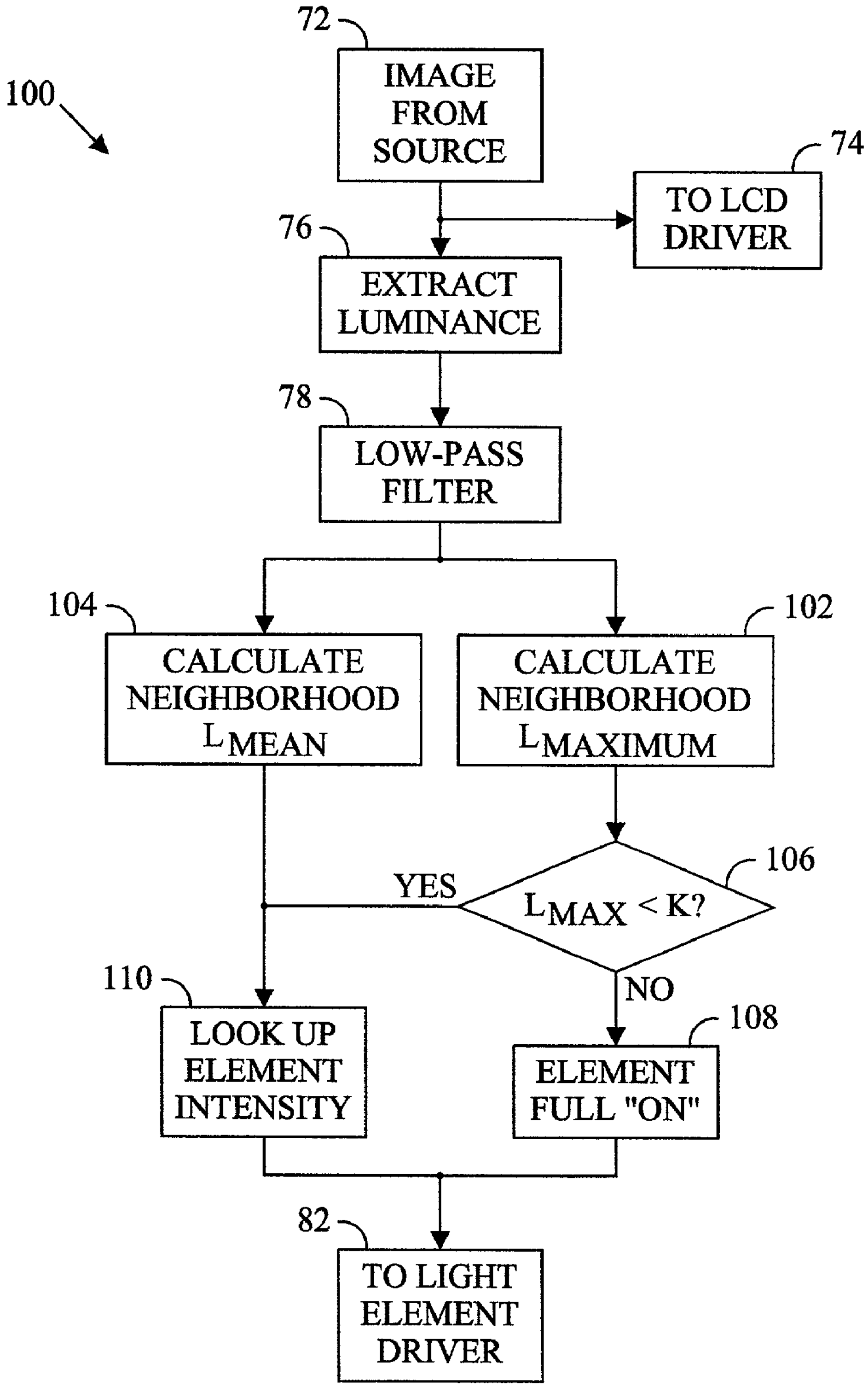
FIG. 5 is a flow diagram of a third technique for increasing the dynamic range of an LCD.

If the LCD and the light sources 30 of the backlight 22 have the same spatial resolution, the dynamic range of the LCD can be extended without concern for spatial artifacts. However, in many applications, the spatial resolution of the array of light sources 30 of the backlight 22 will be substantially less than the resolution of the LCD and the dynamic range extension will be performed with a sampled low frequency (filtered) version of the displayed image. While the human visual system is less able to detect details in dark areas of the image, reducing the luminance of a light source 30 of a backlight array 22 with a lower spatial resolution will darken all image features in the local area. Referring to FIG. 5, in a third technique of dynamic range extension 100, luminance attenuation is not applied if the dark area of the image is small or if the dark area includes some small bright components that may be filtered out by the low pass filtering. In the third dynamic range extension technique 100, the luminance is extracted 76 from the image data 72 and the data is low pass filtered 78. Statistical information relating to the luminance of pixels in a neighborhood illuminated by a light source 30 is obtained and analyzed to determine the appropriate illumination level of the light source. A data processing unit determines the maximum luminance of pixels within the projection area or neighborhood of the light source 102 and whether the maximum luminance exceeds a threshold luminance 106. A high luminance value for one or more pixels in a neighborhood indicates the presence of a detail that will be visually lost if the illumination is reduced. The light source is driven to full illumination 108 if the maximum luminance of the sample area exceeds the threshold 106. If the maximum luminance does not exceed the threshold luminance 106, the light source driver signal modulates the light source to attenuate the light emission. To determine the appropriate modulation of the light source, the data processing unit determines the mean luminance of a plurality of contiguous pixels of a neighborhood 104 and the driver signal is adjusted according to a resealing relationship included in a look up table 110 to appropriately attenuate the output of the light source 30. Since the light distribution from a point source is not uniform over the neighborhood, statistical measures other than the mean luminance may be used to determine the appropriate attenuation of the light source.

The spatial modulation of light sources 30 is typically applied to each frame of video in a video sequence. To reduce the processing required for the light source driving system, spatial modulation of the backlight sources 30 may be applied at a rate less than the video frame rate. The advantages of the improved dynamic range are retained even though spatial modulation is applied to a subset of all of the frames of the video sequence because of the similarity of temporally successive video frames and the relatively slow adjustment of the human visual system to changes in dynamic range.

With the techniques of the present invention, the dynamic range of an LCD can be increased to achieve brighter, higher contrast images characteristic of other types of the display devices. These techniques will make LCDs more acceptable as displays, particularly for high end markets.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of illuminating a backlit display, said method comprising the step of spatially varying the luminance of a light source illuminating a plurality of displayed pixels in response to a plurality of pixel values dependent on the content of an image to be displayed on said display and modifying the illumination from said display based upon a filter that is determined at least in part by a non-uniform illumination profile of said light source, and varying the transmittance of a light valve of said display in a non-binary manner, wherein said light source is spatially displaced at a location at least partially directly beneath said plurality of pixels, wherein regions of said image that are sufficiently dark are attenuated by reducing the luminance of said light source, wherein regions of said image that are not said sufficiently dark are not attenuated in the same manner as said sufficiently dark regions by reducing the luminance of said light source, wherein different regions of said light source provide different non-zero luminance, modifying the light to be output from said display by rescaling said output from said display in such a manner to alter the tone-scale of said output from said display from a state that would have substantially non-uniform tone-scale to a state that has substantially uniform tone-scale resulting from the luminance of said light source.

2. The method of claim 1 wherein a relationship of said pixel values and said luminance of said light source is a nonlinear relationship.

3. The method of claim 1 further comprising the step of filtering pixel value for a plurality of pixels.

4. The method of claim 3 further comprising the step of sampling said filtered intensity value for a spatial location of said light source.

5. The method of claim 3 further comprising the step of rescaling a sample of said filtered intensity value to reflect a nonlinear relationship between said intensity of said light source and said intensity of said displayed pixel.

6. The method of claim 1 further comprising:

(a) operating said light source at substantially a maximum luminance if a luminance of at least one displayed pixel exceeds a threshold luminance; and (b) otherwise, attenuating said luminance of said light source according to a relationship of said luminance of said light source and a luminance of a plurality of pixels.

7. The method of claim 6 wherein the step of attenuating a luminance of a light source according to a relationship of said luminance of said light source and a luminance of a plurality of pixels comprises the step of attenuating said luminance of said light source based upon of said luminance of said light source and a mean luminance of said plurality of pixels.

8. The method of claim 1 wherein said spatially varying the luminance is based upon low pass filtered pixel values.

9. The method of claim 1 further comprising variably reducing luminance of a portion of said light source based upon a dark local spatial area of said pixel data.

10. The method of claim 1 further comprising non-linear modification of said pixel values in a manner that simulates a CRT display.

11. A method of illuminating a backlit display, said method comprising the step of spatially varying the luminance of a light source illuminating a plurality of displayed pixels in response to a plurality of pixel values dependent on the content of an image to be displayed on said display and modifying the illumination from said display based upon a filter that is determined at least in part by a non-uniform illumination profile of said light source, and varying the transmittance of a light valve of said display in a non-binary manner, wherein said light source is spatially displaced at a location at least partially directly beneath said plurality of pixels, wherein regions of said image that are sufficiently dark are attenuated by reducing the luminance of said light source, wherein regions of said image that are not said sufficiently dark are not attenuated in the same manner as said sufficiently dark regions by reducing the luminance of said light source, wherein different regions of said light source provide different non-zero luminance.

* * * * *

UNITED STATES PATENT AND TRADEMARK OFFICE

CERTIFICATE OF CORRECTION

PATENT NO. : 7,064,740 B2 
APPLICATION NO. : 10/007118
DATED : June 20, 2006
INVENTOR(S) : Scott J. Daly It is certified that error appears in the above-identified patent and that said Letters Patent is hereby corrected as shown below:

<u>Column 4, line 41-42</u>
Change “primary color elements (typically, red, green, and blue) elements making up a display pixel.” to --primary color elements (typically, red, green, and blue) making up a display pixel.--

<u>Column 6, line 3</u>
Change “resealing” to --rescaling--

<u>Column 7, line 12</u>
Change “resealing” to --rescaling--

Signed and Sealed this

Twenty-first Day of November, 2006

JON W. DUDAS
*Director of the United States Patent and Trademark Office*